(12) United States Patent
Serstad et al.

(10) Patent No.: US 12,722,897 B2
(45) **Date of Patent: *Sep. 1, 2026**

(54) STORAGE, RETRIEVAL AND ORDER SORTATION ARRANGED IN VERTICAL ORIENTATION

(71) Applicant: Tompkins Robotics, Inc., Orlando, FL (US)

(72) Inventors: James M. Serstad, Orlando, FL (US); Michael C. Futch, Cocoa, FL (US); Parthiban A. Mathavan, Cary, NC (US)

(73) Assignee: TOMPKINS ROBOTICS, INC., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/219,084

(22) Filed: May 27, 2025

(65) Prior Publication Data

US 2025/0289664 A1 Sep. 18, 2025

Related U.S. Application Data

(63) Continuation of application No. 18/743,203, filed on Jun. 14, 2024, now Pat. No. 12,330,875, which is a continuation of application No. PCT/US2024/033838, filed on Jun. 13, 2024.

(60) Provisional application No. 63/565,644, filed on Mar. 15, 2024.

(51) Int. Cl.
*B65G 1/04* (2006.01)
*B65G 1/137* (2006.01)

(52) U.S. Cl.
CPC ......... *B65G 1/1378* (2013.01); *B65G 1/0464* (2013.01); *B65G 1/0492* (2013.01)

(58) Field of Classification Search
CPC ... B65G 1/1378; B65G 1/0464; B65G 1/0492
See application file for complete search history.

(56) References Cited

U.S. PATENT DOCUMENTS 9,037,286 B2 5/2015 Lert
9,555,978 B1 1/2017 Hanssen et al.
9,725,241 B2 8/2017 Swinkles et al.
10,968,087 B2 4/2021 Zhu et al.
11,318,499 B2 5/2022 Kalouche et al.
11,501,246 B1 11/2022 Futch et al.
11,572,233 B2 2/2023 Futch et al.

(Continued)

*Primary Examiner* — Saul Rodriguez
*Assistant Examiner* — Ashley K Romano
(74) *Attorney, Agent, or Firm* — Parthiban A Mathavan

(57) ABSTRACT

Order fulfillment system comprises an order sortation system and an article storage and retrieval system positioned directly above the order sortation system. A controller is configured to: receive an order; direct a retrieval mechanism to move a storage bin containing a first article required for the order to an output station; determine a first destination receptacle among a plurality of destination receptacles to deliver, with a computer controlled vehicle, the first article based on a destination determined for the first article; direct collecting, at the output station, of the first article from the storage bin; direct the computer controlled vehicle to transport the first article received at the output station to the first receptacle.

20 Claims, 11 Drawing Sheets

(56) References Cited

U.S. PATENT DOCUMENTS

| | | | |
|---|---|---|---|
| 11,586,187 B2 | 2/2023 | Futch et al. | |
| 11,623,342 B2 * | 4/2023 | Coady | B25J 9/1676 700/79 |
| 11,685,603 B1 | 6/2023 | Serstad et al. | |
| 11,720,122 B1 | 8/2023 | Serstad et al. | |
| 11,759,826 B1 | 9/2023 | Baring et al. | |
| 11,893,533 B2 * | 2/2024 | Pankratov | G06Q 10/087 |
| 11,912,514 B2 | 2/2024 | Futch et al. | |
| 11,987,447 B2 | 5/2024 | Serstad et al. | |
| 12,410,012 B1 * | 9/2025 | Patel | B65G 1/1371 |
| 2019/0160493 A1 | 5/2019 | Garrett et al. | |
| 2022/0194248 A1 | 6/2022 | Kalouche | |
| 2022/0297941 A1 | 9/2022 | Gabreieli et al. | |
| 2023/0033636 A1 | 2/2023 | Mohan et al. | |

* cited by examiner

STORAGE, RETRIEVAL AND ORDER SORTATION ARRANGED IN VERTICAL ORIENTATION

CROSS-REFERENCE TO RELATED APPLICATIONS

This application claims priority to U.S. Provisional Patent Application No. 63/565,644 filed on Mar. 15, 2024, entitled "STORAGE, RETRIEVAL AND ORDER SORTATION ARRANGED IN VERTICAL ORIENTATION," the entire contents of which are incorporated by reference herein.

TECHNICAL FIELD

This invention relates generally to the field of warehouse automation, and particularly to systems and methods for sorting articles retrieved from storage bins with automated devices.

BACKGROUND

Order fulfillment is becoming increasingly ubiquitous as online sales increase and as "just in time" (JIT) delivery to retail locations is becoming common. Order fulfillment often is a wholly manual process. Humans, referred to as pickers, traverse aisles of a warehouse or fulfillment center, picking articles from shelves or bins, for assembling all articles associated with a particular order. In recent times, automated solutions employing robotic components have been introduced for use with order fulfillment. For example, robotics order sortation systems operate to sort articles to destinations. In some alternate applications, articles to be sorted may be retrieved from an automated storage and retrieval system (ASRS) that operates to facilitate the order fulfillment workflow. An ASRS typically includes a three-dimensional array of storage spaces, with robotic mechanisms operating either on racks/rails that extend across a top of the array and down a number of shafts through the array or in aisles between the racks to automatically store and retrieve articles from the storage spaces and deliver the retrieved articles to one or more output stations. Humans working at the output stations may then assemble orders from the articles retrieved from the ASRS.

Challenges may arise regarding fitting all required order fulfillment automation equipment within a limited footprint particularly when expanding the footprint is expensive or impracticable. Accordingly, a need exists for a solution that would permit an automated fill system to optimize available space capacity in a cost-effective manner.

SUMMARY OF INVENTION

This summary is provided to introduce in a simplified form concepts that are further described in the following detailed descriptions. This summary is not intended to identify key features or essential features of the claimed subject matter, nor is it to be construed as limiting the scope of the claimed subject matter.

According to one or more embodiments, a system for use with order fulfillment system is provided. According to at least one embodiment, the system comprises an order sortation system comprising one or more computer controlled vehicles for transporting and depositing articles to be sorted into a plurality of receptacles in response to commands. The system further comprises an article storage and retrieval system positioned directly above the order sortation system, the article storage and retrieval system comprising a three-dimensional array of storage spaces from which the articles to be sorted are automatically retrievable by one or more retrieval mechanisms in response to commands. The system further includes a controller. The controller is configured to: receive an order; direct a retrieval mechanism of the article storage and retrieval system to move a storage bin containing a first article required for the order to an output station; determine a first destination receptacle among a plurality of destination receptacles to deliver, with a computer controlled vehicle, the first article based on a destination determined for the first article; direct collecting, at the output station, of the first article from the storage bin; direct the computer controlled vehicle to transport and deposit the first article into the first receptacle, wherein the first destination receptacle corresponds with the order; and determine when the order is complete.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems, and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION OF THE EMBODIMENTS

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention. The present invention will be further described with reference to the accompanying drawings:

Centralized fulfillment of customer orders is becoming ubiquitous with more and more businesses opting for semi-automated or substantially automated filling operations to achieve economies of scale and to improve the overall efficiency of order fulfillment. However, space limitations often pose a challenge to fitting all order filling equipment within a fixed footprint particularly in instances where expanding the footprint is impracticable or prohibitively expensive.

Figure 1:
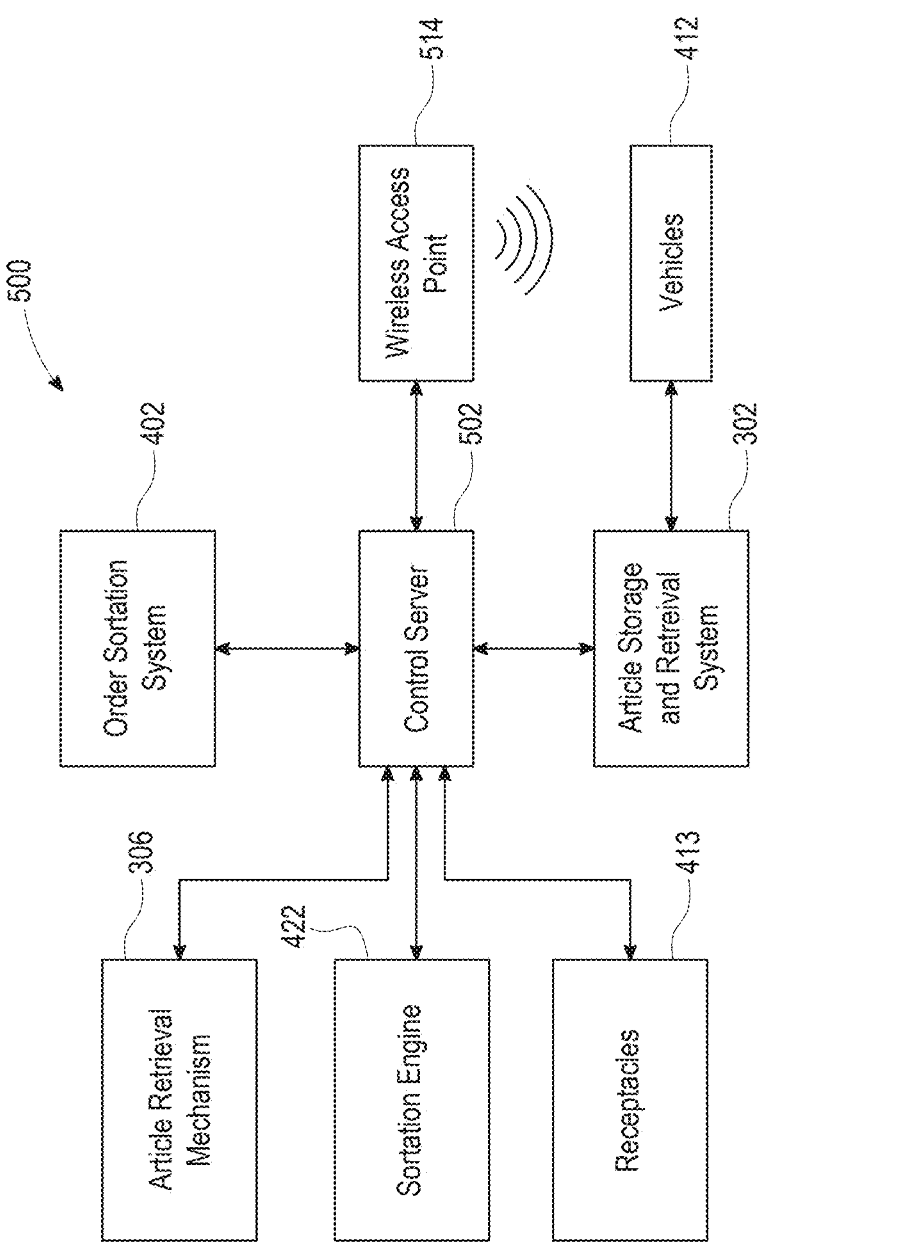
FIG. 1 depicts a block diagram of an exemplary improved order fulfillment system that includes an article storage and retrieval system and an order sortation system, both of which are accommodated at least partially one above the other within a same footprint, according to one or more implementations of the presently disclosed subject matter.

According to various embodiments of the disclosed subject matter, provided herein are systems, methods, and apparatus for directing, managing, and controlling order fulfillment in a centralized or localized operation. According to at least one embodiment, as shown in FIG. 1, order fulfillment system 500 (may hereinafter be alternately referred to as "system 500" or just "system") comprises, among others, a control server such as control server 502 (control server 502 may alternately be referred generically as "controller"), an article storage and retrieval system 302 having articles stored in storage bins 312 for retrieval by article retrieval mechanism 306, an order sortation system 402 for sorting items such as articles 107 to orders or to destination containers such as receptacles 413 using computer-controlled transport vehicles, a sortation engine 422 that may perform receptacle assignment, at least one wireless access point 514, and a plurality of computer-controlled transport vehicles such as vehicles 412. In at least one embodiment, control server 502 (i.e., the "controller") comprises two constituent controllers—a first controller such as an automated storage and retrieval system (ASRS) controller and a second controller such as a sortation controller.

In one embodiment, at least a portion of a footprint of the article storage and retrieval system 302 extends beyond a footprint of the order sortation system 402. In at least one embodiment, at least a portion of a footprint of the order sortation system 402 extends beyond a footprint of the article storage and retrieval system 302. In at least one embodiment, a footprint of the order sortation system 402 is less than a footprint of the article storage and retrieval system 302. In at least one embodiment, the article storage and retrieval system 302 is arranged above the order sortation system 402 in a vertical stacked configuration such that at least 51% of a vertical projection of a footprint of the order sortation system 402 is accommodated within a vertical projection of a footprint of the article storage and retrieval system 302.

Figure 11:
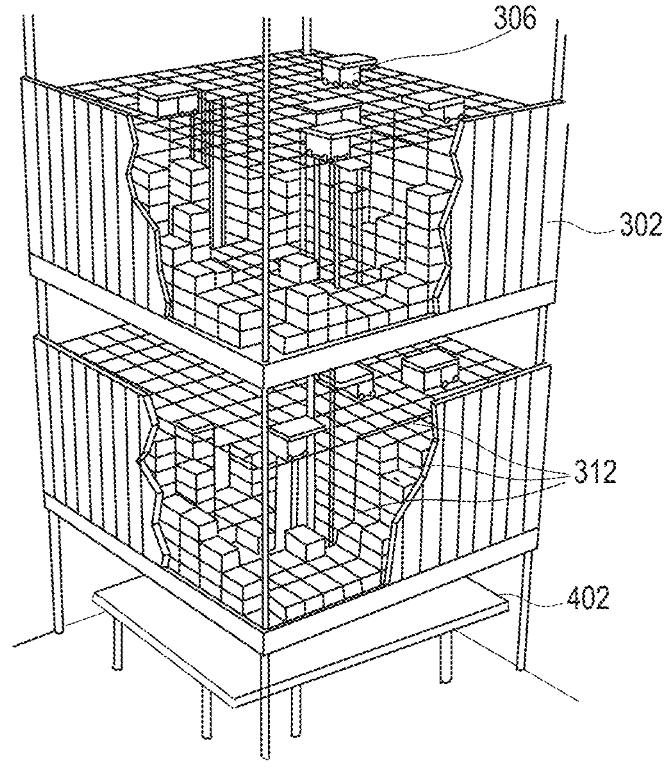
FIG. 11 depicts a schematic side view of a portion of the order fulfillment system of FIG. 1 that shows certain aspects of the article storage and retrieval system, according to at least one embodiment of the presently disclosed subject matter.

In various embodiments, article storage and retrieval system 302 (at least a portion of which is illustrated in FIG. 11, for example) is positioned directly above order sortation system 402. In at least one embodiment, article storage and retrieval system 302 is positioned directly below order sortation system 402 where the conditions require such an arrangement; however, in most applications, it may be advantageous to have article storage and retrieval system 302 positioned directly above order sortation system 402.

As illustrated, for e.g., in FIG. 11, in various embodiments, article storage and retrieval system 302 comprises a grid structure of storage cells, each storage cell of the grid structure being arranged to accommodate a vertical stack of storage bins. In at least some embodiments, article storage and retrieval system 302 comprises a three-dimensional array of storage spaces from which the articles to be sorted are automatically retrievable by one or more retrieval mechanisms in response to commands. The grid structure has a top level comprising tracks arranged horizontally along two axes. A first robotic device having two sets of wheels may be arranged to move horizontally along the tracks at the top level of the grid structure. Each storage space may be provided with a storage bin 312 that carries the articles to be sorted such as articles 107. In embodiment, article storage and retrieval system 302 comprises a first grid structure of storage cells, each storage cell being arranged to accommodate a vertical stack of storage bins 312, the first grid structure having a top level.

In various embodiments, article storage and retrieval system 302 comprises article retrieval mechanism 306 that may take various forms; in one embodiment, article retrieval mechanism 306 includes a combination of a first robotic device and a bin lift device (bin lift device is not shown in the Figures). In one such embodiment where article retrieval mechanism 306 includes a combination of a first robotic device and a bin lift device, first robotic device may be arranged to move horizontally at the top level of the first grid structure combined with a bin lift device, arranged to convey a storage bin 312 in a vertical direction between the top level of the grid structure and a delivery station such as output station 310. The first robotic device may be further arranged to receive a storage bin 312 from a storage cell at the top level of the first grid structure and to deliver the storage bin 312 to the bin lift device. The bin lift device may be arranged to receive a storage bin from the first robotic vehicle at the top level of the first grid structure and to convey the storage bin to output station 310. Each first robotic device may be equipped with a lift for picking up, carrying, and placing storage bins 312 that are stored in the corresponding grid structure. When a first robotic device delivers a storage bin 312 to a bin lift, the bin lift exchanges this storage bin with the previously used storage bin and the first robotic device returns it back to storage. Each grid structure may, for e.g., be constructed as an aluminum (or other possible materials) structure, organized in rectangular or cuboidal storage cells. In one embodiment, each storage cell may have room for several storage bins 312 that are stored on top of each other. Different configurations of height and shape are possible, making the grid structure able to surround pillars and other obstacles. Accordingly, in various embodiment, the bin lift device is arranged to receive a storage bin directly from the first robotic device at the top level of the grid structure and to convey the storage bin without the first robotic device to the output station, for e., by use of an elevator such as elevator 308. The bin lift device may be configured to travel vertically within a storage cell of the grid. The output station may be advantageously arranged below and underneath the grid structure at a different vertical level than the grid structure.

Accordingly, in at least one embodiment, article retrieval mechanism 306 comprises a first robotic device equipped with a lifting device arranged to lift the plurality of storage bins 312 from a first grid structure of storage cells in a single operation. A lifting device of article retrieval mechanism 306 may be configured to grip or engage with a lowermost one of the plurality of storage bins 312. The lifting device may comprise one or more lifting arms. When an aperture is provided, a pair of lifting arms may be arranged on either side of the aperture. The lifting arms may be telescopic. In one embodiment, the lifting device comprises rods or cables arranged to engage with vertical channels formed in the side walls of the storage bins 312. The channels may be accessed by apertures on a top face of each storage bins 312.

In at least one embodiment, article retrieval mechanism 306 comprises a first robotic device equipped with a lifting device arranged to lift a single storage bin 312 from the vertical stack of storage bins. For this purpose, the first robotic device may include an aperture through or into which the storage bin 312 can be lifted. The lifting device may comprise a pair of lifting arms arranged on either side of the aperture, in which case the lifting device may comprise a gripper device mounted between the ends of the arms and arranged to grip a storage bin 312 from above.

In various embodiments, storage bin 312 is the basic module in which articles to be sorted such as articles 107 are stored. Storage bin 312 may, for e.g., be embodied in two different heights and can be produced in dissimilar materials in order to achieve particular properties, such as polypropylene or high-density polyethylene. In a particular aspect, anti-static storage bins may be used for accommodating electronics components. In one implementation, a storage bin may have length 600 mm×width 400 mm, with heights of 210 mm or 310 mm. Each first robotic device may be remotely controlled, for instance by means of a wireless radio-based communication link. To this end, wireless access point 514 may serve as a wireless router for providing communication between the controller (i.e., control server 502) and each first robotic device. Wireless access point 514 may be arranged in the vicinity of the system as a whole, or separate access points may be employed for various parts of the storage etc. In some embodiments, storage bin 312 is transferred to an output station 310 by one of: a cable trolley, a shuttle robot traveling on a railing, and an elevator.

In at least one embodiment, article storage and retrieval system 302 may have same or similar features as generally described in U.S. Pat. No. 11,827,448 B2 filed by Autostore Technology AS, which is hereby incorporated herein by reference in its entirety.

According to at least one embodiment, order sortation system 402 of order fulfillment system 500 comprises one or more computer controlled vehicles such as vehicles 412 for transporting and depositing articles to be sorted such as articles 107 into a plurality of receptacles such as receptacles 413 in response to commands. In one embodiment, control server 502 (also referred to herein as the "controller") is in communication with sortation engine 422 in order to determine a specific receptacle 413 among a plurality of receptacles 413 to deliver, with a vehicle 412, an article 107 based on a destination determined for the article 107 as accessed from sortation engine 422. According to one or more embodiments, each vehicle 412 has a first position in which an article 107 is stowed about the vehicle 412 and a second position in which the article 107 is deposited into a proximal receptacle 413.

In at least one embodiment, each vehicle 412 is configured for traveling in all directions on a platform to transport and deposit an article 107, i.e., the vehicle 412 is not configured to travel along a set path or route; by contrast, in one alternate embodiment, each vehicle 412 is configured for traveling along one or more specific or predetermined paths or routes on a platform to transport and deposit an article 107.

According to at least one embodiment, order sortation system 402 further includes a sortation controller configured to receive an order for a plurality of disparate articles. Sortation controller determines one receptacle 413 of a plurality of receptacles 413 to direct the vehicle 412 to deposit a selected article 107. The sortation controller may further direct the vehicle 412 to transport a selected article 107 to the destination receptacle 413 and deposit the article 107 by manipulation of the first vehicle 412 from the first position to the second position for deposit of the selected article 107 in the destination receptacle. The sortation controller may further direct a second vehicle 412 to transport a disparate article 107 to the same destination receptacle 413 or to a different destination receptacle 413 and deposit the disparate article 107 by manipulation of the second vehicle 412 from the first position to the second position for deposit of the disparate article 107 in the destination receptacle 413 and determine when the order has been completed.

According to one or more embodiments, the sortation controller for use with material handling of a plurality of articles includes a memory and a processor. The sortation controller is configured to receive a plurality of orders for a plurality of disparate articles, batch the plurality of orders over a period of time, interact with an identifier affixed to an article 107 or packaging associated with the article 107 in order to determine a characteristics of the article 107, determine one destination receptacle 413 of a plurality of destination receptacles 413 to deposit, with a vehicle 412, a selected article 107, wherein the destination receptacle is determined based on at least one order and the determined characteristic of the selected article 107. The sortation controller may further direct a first vehicle 412 to transport a selected article 107 to the destination receptacle 413 and deposit the selected article 107 by manipulation of the first vehicle 412 from a first position to a second position for deposit of the selected article 107 in the destination receptacle 413. In various embodiments, order sortation system 402 may have same or similar features as generally described in U.S. Pat. Nos. 9,975,148 B2, 11,759,826 B1, and in U.S. Provisional Patent Application No. 63/491,182, which are hereby incorporated herein by reference in their entireties. In one embodiment, the article storage and retrieval system 302 is a standalone system from a first manufacturer (such as for e.g., the Ocado Group or Autostore™) and the order sortation system 402 is a standalone system from a second manufacturer (such as Tompkins Robotics, Inc.), such that the second manufacturer is different and independent from the first manufacturer.

According to at least one embodiment, the controller (i.e., control server 502) is configured to: receive an order for a plurality of disparate articles. The controller may then direct article retrieval mechanism 306 of article storage and retrieval system 302 to move a storage bin 312 containing a first article required for the order to an output station 310. The controller may further determine a first destination receptacle 413 among a plurality of destination receptacles 413 to deliver, with vehicle 412, the first article 107 based on a destination determined for the first article 107. The controller may further direct collecting, at the output station 310, of the first article 107 from the storage bin 312. The controller is further configured to direct vehicle 412 to transport the first article 107 for sorting the first article 107 into the first receptacle 413, wherein the first destination receptacle 413 corresponds with an order. The controller is further configured to determine when the order (e.g., a customer order, a store order, a zip code order) is complete.

In at least one embodiment, order sortation system 402 operates to collate one or more retrieved items by, and into, orders. Order sortation or collation may occur as part of packaging or loading into totes or receptacles, or may occur at or at least proximate a packing location or station. Orders may, for example, be placed by and/or destined for delivery to end consumers and/or retail locations. Each order may include one or more articles. Where an order includes two or more articles, those articles may be multiple instances of the same respective type of article or SKU, and/or may include two or more distinct types or articles or SKUs. Orders may include articles actually ordered by an end customer or retail location. In some instances, an order may include additional articles, in addition to articles actually ordered by an end customer. For example, some articles may be offered or provided as a kit or promotional kit. In one embodiment, system 500 organizes orders by delivery destination, for instance by postal code (e.g., ZIP code) and/or by retail location. Some implementations may omit destination sortation systems, either not sorting by destination or implementing the destination sort via the order sortation system 402. In various embodiments, one or more of control server 502, the sortation controller, and the ASRS controller may be operable to control one or more of article storage and retrieval system 302 and order sortation system 402. This arrangement may advantageously allow for the improved utilization of the limited floor space availability.

Figures 2A, 2B, 2C, 2D:
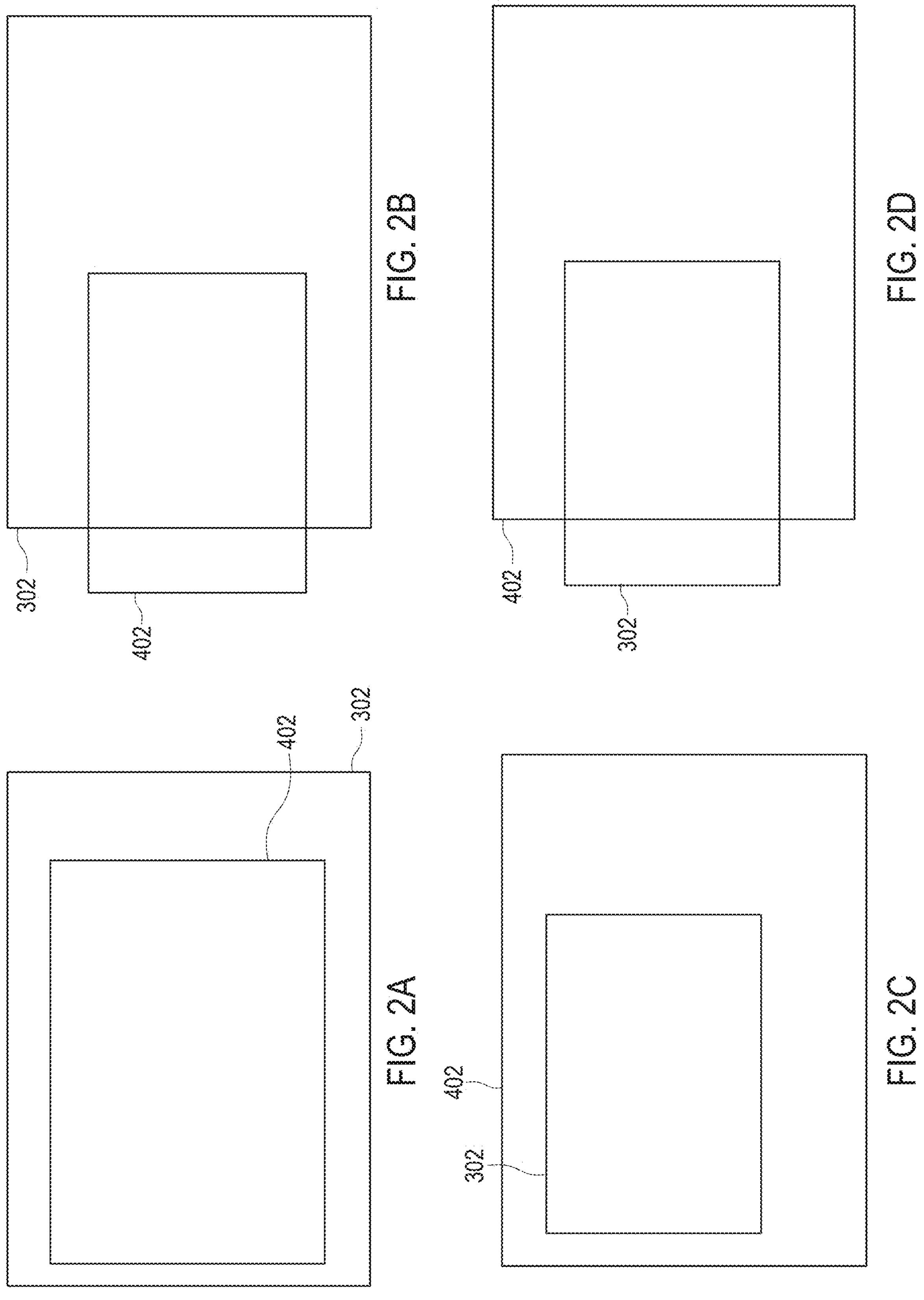
FIG. 2A depicts a top schematic view of the system of FIG. 1 showing a footprint of the order sortation system completely accommodated within a footprint of the article storage and retrieval system.
FIG. 2B depicts a top schematic diagram of the system of FIG. 1 showing the footprint of the order sortation system partially accommodated within the footprint of the article storage and retrieval system.
FIG. 2C depicts a top schematic diagram of the system of FIG. 1 showing the footprint of the article storage and retrieval system completely accommodated within the footprint of the order sortation system; and, FIG. 2D depicts a top schematic diagram of the system of FIG. 1 showing the footprint of the article storage and retrieval system partially accommodated within the footprint of the order sortation system, according to one or more implementations of the presently disclosed subject matter.

FIG. 2A shows a top view footprint of order sortation system 402 completely accommodated within a vertical projection of a footprint of article storage and retrieval system 302. Accordingly, in one embodiment, a whole footprint of order sortation system 402 is fully and completely accommodated within a footprint of article storage and retrieval system 302; stated differently, a vertical projection of order sortation system 402 is accommodated 100% within the vertical projection of article storage and retrieval system 302, as illustrated, for example, in FIG. 2A. This arrangement may advantageously allow for the improved utilization of limited floor space availability.

FIG. 2B depicts a schematic diagram of the system of FIG. 1 showing the footprint of order sortation system 402 partially accommodated within a vertical projection of the footprint of article storage and retrieval system 302. Accordingly, in one embodiment, at least 51% or more (e.g., 55%, 60%, 65%, 70%, 75%, 80%, 85%, 90%, 95%, 98%, or 99%) of a square footage of a footprint of order sortation system 402 is accommodated within a vertical projection of the footprint of the article storage and retrieval system 302, as illustrated, for example, in FIG. 2B. This arrangement may advantageously allow for the improved utilization of limited floor space availability.

FIG. 2C depicts a schematic diagram of the system of FIG. 1 showing the footprint of article storage and retrieval system 302 completely accommodated within a vertical projection of the footprint of order sortation system 402. Accordingly, in one embodiment, a whole footprint of article storage and retrieval system 302 is fully and completely accommodated within a footprint of order sortation system 402; accordingly, a vertical projection of article storage and retrieval system 302 may lie 100% within the vertical projection of order sortation system 402, as illustrated, for example, in FIG. 2C. This arrangement may advantageously allow for the improved utilization of limited floor space availability.

FIG. 2D depicts a schematic diagram of the system of FIG. 1 showing the footprint of article storage and retrieval system 302 partially accommodated within a vertical projection of the footprint of order sortation system 402. Accordingly, in one embodiment, at least 51% or more (e.g., 55%, 60%, 65%, 70%, 75%, 80%, 85%, 90%, 95%, 98%, or 99%) of a square footage of a footprint of article storage and retrieval system 302 is accommodated within a vertical projection of the footprint of order sortation system 402, as illustrated, for example, in FIG. 2D. This arrangement may advantageously allow for the improved utilization of the limited floor space availability.

In various embodiments, the computer controlled vehicle such as vehicle 412 travels on a platform such as platform 508 that is elevated from a proximal surface. In one embodiment, the proximal surface is the floor or the ground level. In various embodiments, computer controlled vehicle such as vehicle 412 comprises wheels that contact platform 508 while the vehicle 412 travels on platform 508—either in all directions or along predetermined or fixed paths. In one embodiment, the computer controlled vehicle thus comprises wheels that contact the platform while the computer controlled vehicle travels on the platform.

In various embodiments, an output of article storage and retrieval system 302 and an output of order sortation system 402 are provided as inputs to a warehouse management system (WMS). As understood by a person of skill in the relevant art, a WMS is software that helps companies manage and control daily warehouse operations, from the moment goods and materials enter a distribution or fulfillment center until the moment they leave. WMS software systems are a key component of an entity's supply chain management and can offer real-time visibility into a company's entire inventory, in warehouses and in transit. In addition to inventory management, a WMS can also offer tools for picking and packing processes, resource utilization, analytics, and more. In at least one embodiment, a WMS software system operating at the facility may represent the controller (i.e., control server 502), and may otherwise be in two-way communication with article storage and retrieval system 302 and order sortation system 402. In some embodiments, control server 502 comprises a ASRS controller associated with article storage and retrieval system 302 and a sortation controller associated with order sortation system 402, wherein an output of the ASRS controller is provided as an input to the sortation controller. Accordingly, in one embodiment, article storage and retrieval system 302 may have its own dedicated control system in the form of the ASRS controller including one or more processors and nontransitory processor readable media that stores processor-executable instructions which, when executed by the at least one processor controls operation of article storage and retrieval system 302. Article retrieval mechanism 306 forming part of article storage and retrieval system 302 can include first robotic devices that have their respective control systems including one or more processors and nontransitory processor readable media that stores processor-executable instructions which, when executed by the processor controls operation of article retrieval mechanism 306. The ASRS controller may include, or be communicatively coupled to one or more sensors (e.g., digital cameras, GPS receiver, contact sensors, motion sensors, proximity sensors, LIDAR) carried by first robotic devices (e.g., robotic vehicles) forming part of article retrieval mechanism 306.

Figure 4:
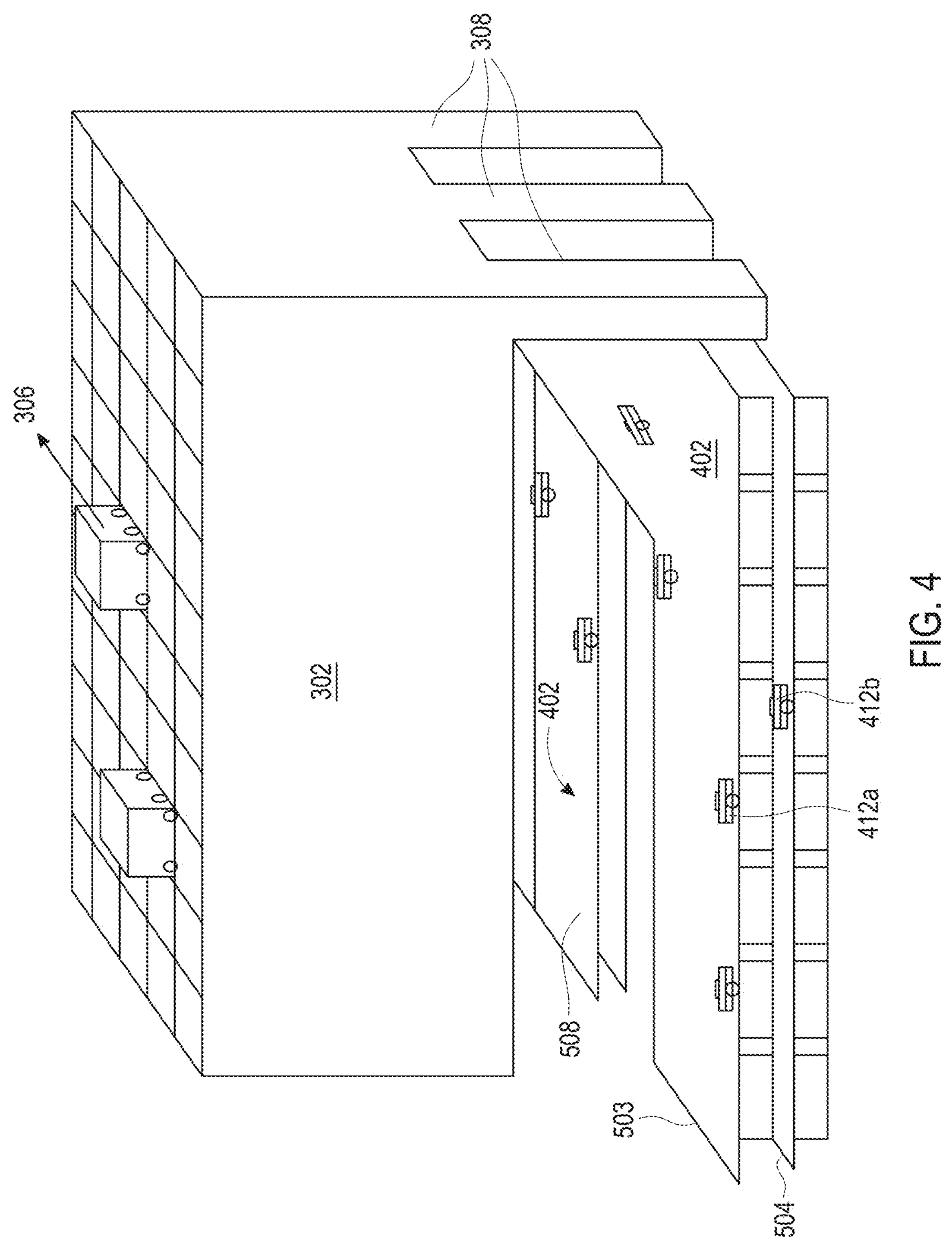
FIG. 4 depicts a front perspective view of a portion of the order fulfillment system of FIG. 1 that includes an article storage and retrieval system and an order sortation system both of which are accommodated one above the other within a same footprint, according to at least one embodiment of the presently disclosed subject matter.

In some embodiments, storage bin 312 is transferred, carried, conveyed, moved, shifted, or relocated to an output station 310 by one of: a cable trolley, a shuttle robot traveling on a railing, and an elevator. After a storage bin 312 is transferred to output station 310 through the aid of article retrieval mechanism 306, for example, either a person or a robotic arm retrieves a first article 107 carried within the storage bin 312 for transfer onto a computer controlled vehicle such as vehicle 412. In one embodiment, article storage and retrieval system 302 is provided with one or more elevators 308 (see FIG. 4) through which storage bin 312 is transferred to output station 310. In one embodiment, a person or a robotic arm or transfer robot 510 transfers the storage bin 312 carrying the first article at the output station 310 onto a vehicle 412.

Figure 9:
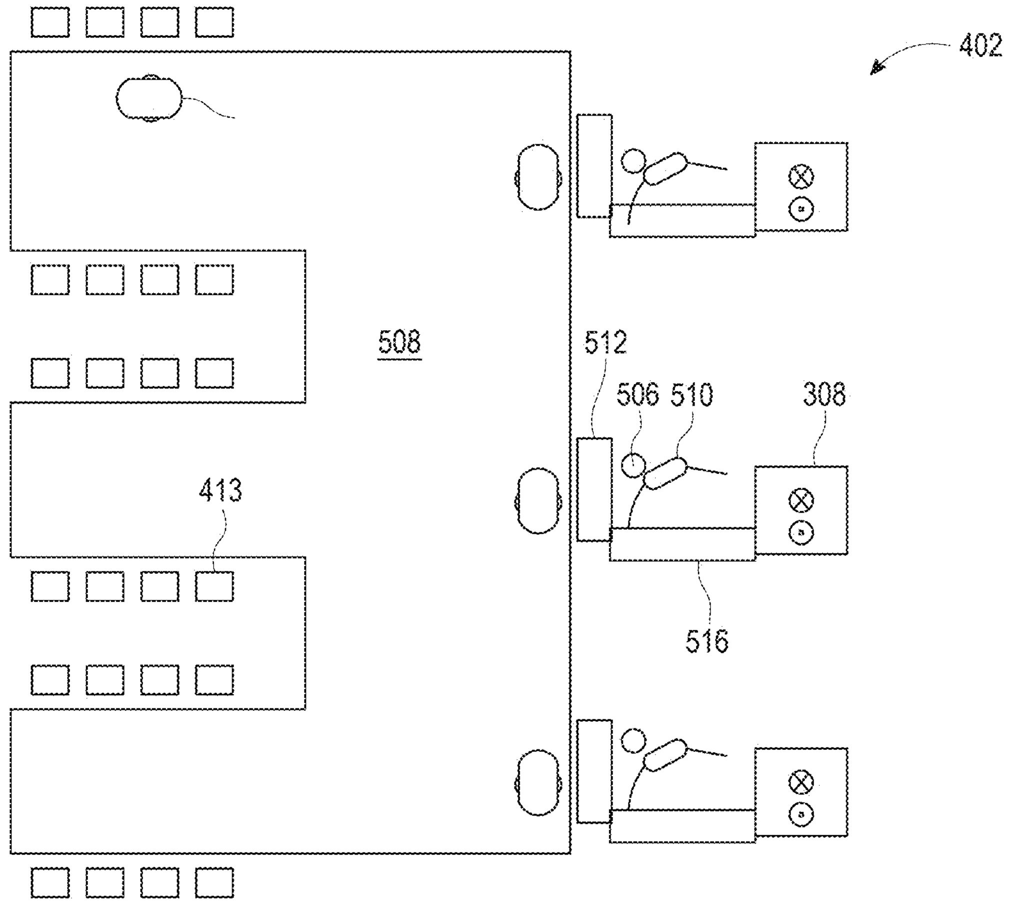
FIG. 9 depicts a top schematic plan view of a portion of the order fulfillment system of FIG. 1 that shows elevators, output stations, conveyor systems, transfer robots, a platform, and a plurality of destination receptacles, according to at least one embodiment of the presently disclosed subject matter.

In some embodiments, a conveying system such as conveyor 516 is provided for transferring either first article 107 or storage bin 312 carrying the first article 107 from output station 310 of article storage and retrieval system 302 to input station 512 of order sortation system 402, as shown, for example, in FIG. 9. Accordingly, in one embodiment, conveyor 516 in the form of a belt conveyor line is positioned and operable to transfer an article 107 from the output station 310 of the article storage and retrieval system 302 to an input station 512 of order sortation system 402. One embodiment may rely on human pickers to move items from output stations 310 of article storage and retrieval system 302 to input stations 512 of the order sortation system 402. Alternatively, or additionally, in an embodiment relying on human pickers to move items from an output station 310 to an input station 512, one or more conveyors 516 may nonetheless be included to assist in the transfer of articles from output stations 310 of the article storage and retrieval system 302 to input stations 512 of order sortation system 402. Alternatively, or additionally, one or more transfer robots 510 (e.g., robotic vehicles, robots with robotic appendages with end effectors or end of arm tools, or combined robotic vehicles with robotic appendages) may be included to assist in the transfer of articles from output stations 310 of article storage and retrieval system 302 to input stations 512 of order sortation system 402.

In one embodiment, the vehicle 412 traverses a track or a platform (such as platform 508) to transport the first article 107 to a position about the first destination receptacle 413 for depositing the first article 107 into the first destination receptacle 413. In at least one embodiment, vehicle 412 traverses one of a track and a platform to transport the first article to a position about the first destination receptacle for depositing the first article into the first destination receptacle. In one embodiment, the computer controlled vehicle traverses one of a track, a platform, and a floor, to transport the first article to a position about the first destination receptacle for depositing the first article into the first destination receptacle.

In various embodiments, order sortation system 402 has one or more input stations 512, and the transfer of an article 107 from an output station 310 of article storage and retrieval system 302 to input station 512 of order sortation system 402 is performed by one or more of: a transfer robot, a conveyor, and a human. Thus, a transfer robot such as transfer robot 510 may operate to transfer one of the first article 107 and the storage bin 312 carrying the article onto input station 512 of order sortation system 402 or onto vehicle 412 of order sortation system 402 without any physical item buffering buffer between the article storage and retrieval system 302 and the order sortation system 402. The transfer robot may thus operate to transfer one of the first article and the storage bin carrying the article at an input station of the order sortation system 402 without any physical item buffering buffer between the article storage and retrieval system 302 and the order sortation system 402.

In various embodiments, the number of output stations 310 of article storage and retrieval system 302 in operation is varied over time, and the controller synchronizes a current retrieval rate of storage and retrieval system 302 with a current sortation rate of order sortation system 402 based at least in part on a total number of output stations 310 of article storage and retrieval system 302 in operation at a given instant of time. In one embodiment, the controller synchronizes a total number of output stations 310 of article storage and retrieval system 302 currently in operation based on a current retrieval rate of storage and retrieval system 302 and a current sortation rate of order sortation system 402.

In one embodiment, control server 502 receives input representative of a current sortation rate or a future sortation rate of order sortation system 402 and control server 502, based on this received input, adjusts a current retrieval rate or a future retrieval rate of storage and retrieval system 302 to not exceed the current or the future sortation rate. In one embodiment, control server 502 adjusts at least one of a retrieval rate of storage and retrieval system 302 and a sortation rate of order sortation system 402 to eliminate or reduce a need for any physical articles buffering mechanism communicatively coupled to at least one of article storage and retrieval system 302 or order sortation system 402.

In one embodiment, order sortation system 402 includes first function sortation system 503 arranged above second function sortation system 504 in a vertical stacked configuration on or within a same footprint whereby the total footprint needed for both first function sortation system 503 and second function sortation system 504 is equal to the footprint needed for one of those two systems 503, 504; in one embodiment, the total footprint needed for both systems is equal to the footprint needed for the larger of two those systems 503, 504.

Control server 502 comprises, among others, a memory, and a processor. In at least one embodiment, control server 502 comprises the ASRS controller that controls the operations of article storage and retrieval system 302 as well as the sortation controller that controls the operations of order sortation system 402. Order fulfillment system 500 further comprises a sortation engine for assisting the sorting operations and receptacle assignment operations such as sortation engine 422. In one embodiment, order fulfillment system 500 further comprises first function vehicles **412*a* as well as second function vehicles 412*b*. In at least one embodiment, the first function vehicles 412*a* and second function vehicles 412*b* are AMRs (automated mobile robots) as the term is well-understood in the art. First function vehicles 412*a* traverse a first function platform forming part of first function sortation system 503 for transporting and depositing first function articles 107 into first sort receptacles. In one embodiment, each first sort receptacle corresponds to a customer order wherein control server 502 associates each first sort receptacle with a respective customer order. Second function vehicles 412*b* traverse a second function platform forming part of second function sortation system 504 for transporting and depositing second function articles 107** into second sort receptacles wherein the second function comprises sorting parcels to shipping destinations. Accordingly, in at least one embodiment, one sortation system can operate as a parcel sorter and the other sortation system can operate as an order consolidation sorter.

Figure 3:
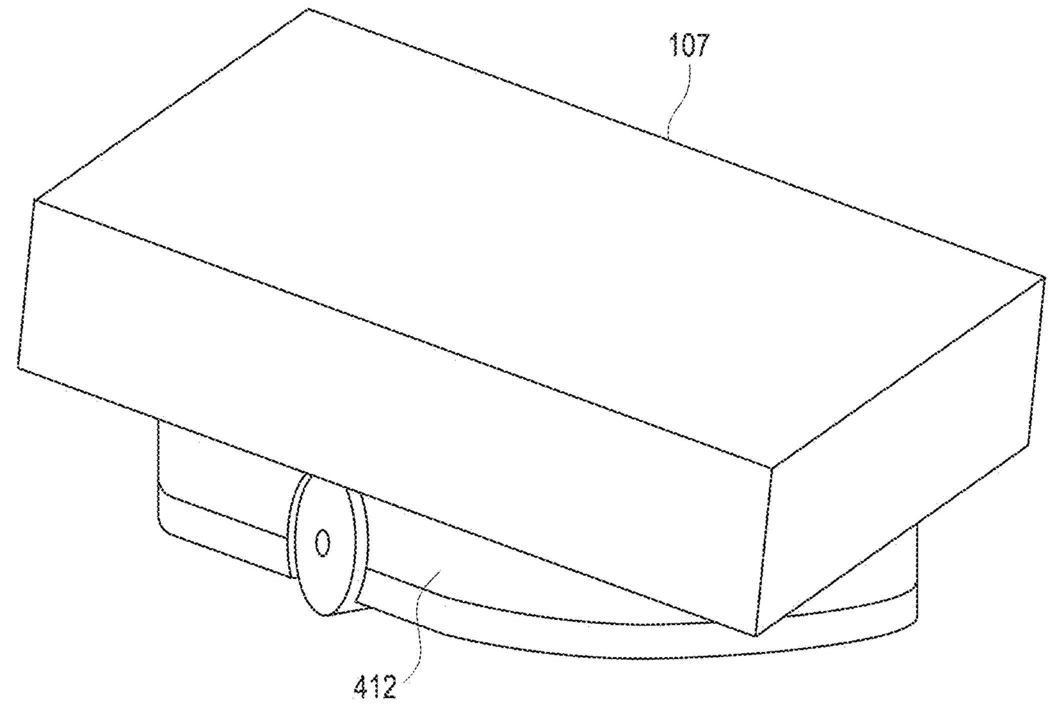
FIG. 3 depicts an example implementation of a computer controlled automated transport vehicle or transport device carrying an article that is to be sorted to a destination receptacle for use with the order fulfillment system of FIG. 1, according to one or more implementations of the presently disclosed subject matter.

In various embodiments, depending on the application at hand, vehicle 412 may comprise an automated mobile robot (AMR), a computer controlled vehicle, a track-arranged device, an overhead transport device, a pedestal robot, a personal AMR, a pick assist AMR, an automated conveyor system, or any similar automated transport or transfer device. For example, in at least one embodiment, it may be advantageous for vehicle 412 to be a pedestal robot as the term is well understood in the relevant art, for example, there is not enough space available to accommodate one or two platforms (i.e., a first function platform forming part of first function sortation system 503 and/or a second function platform forming part of second function sortation system 504) beneath article storage and retrieval system 302. In at least one embodiment, vehicle 412 traverses a first surface, floor area, platform, or a track arrangement. In some embodiments, vehicle 412 may comprise or include a conveyor. In some embodiments, vehicle 412 may take the form of a conveyor. FIG. 3 depicts an example automated transport device such as vehicle 412 for carrying, moving, or transporting an article such as first article 107 to be sorted to a receptacle.

In various embodiments, when control server 502 determines that a receptacle is full or is about to become full, control server 502 directs replacement of the full receptacle with a replacement receptacle. In at least one embodiment, after replacement receptacle is properly positioned in an article receiving position proximal surface such as platform 508 such that it is ready to receive articles, control server 502 is configured to receive confirmation of this. Control server 502 is accordingly further configured to receive confirmation of the replacement of the first receptacle with an empty receptacle. In some embodiments, control server 502 is in communication with a sensing device configured to sense that the empty receptacle is ready to receive articles. In various embodiments, order fulfillment system 500 is further configured to verify that there is at least one non-full receptacle available for delivery of articles thereto, and when this is not the case, control server 502 operates to notify a human operator of the same. In at least one embodiment, when a receptacle 413 becomes full, control server 502 directs a robot or an automated device to transport full receptacle 413 to a location of further processing from its article receiving position that is proximal surface such as platform 508. In some embodiments, the full receptacle 413 is removed manually. In some embodiments, control server 502 is in communication with sensing device configured to sense if and when a receptacle is full or is about to become full. In various embodiments, sensing device is in two-way communication with control server 502.

Figure 5:
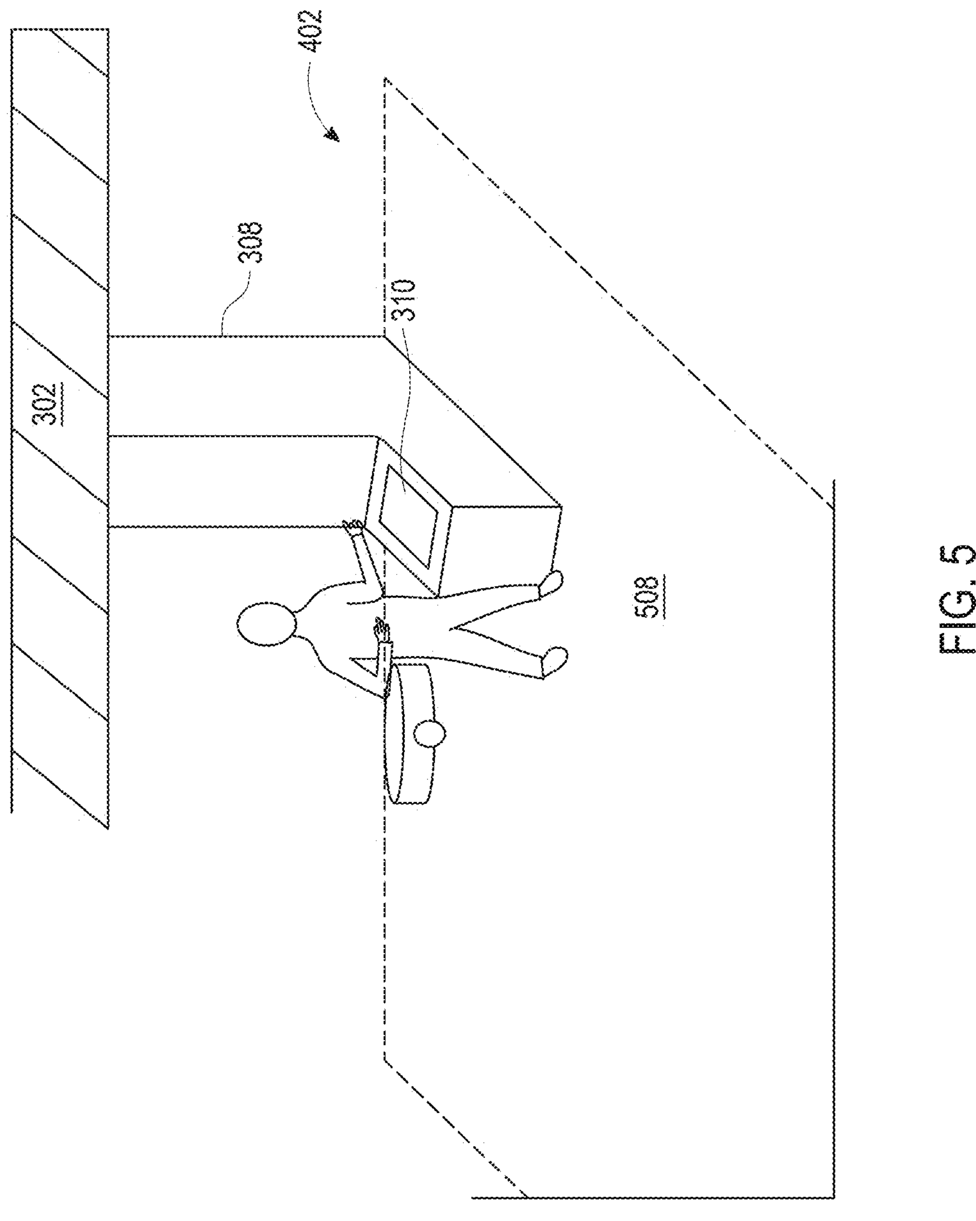
FIG. 5 depicts a perspective view of a portion of the order fulfillment system of FIG. 1 that shows an elevator and an output station, according to at least one embodiment of the presently disclosed subject matter.
Figure 6:
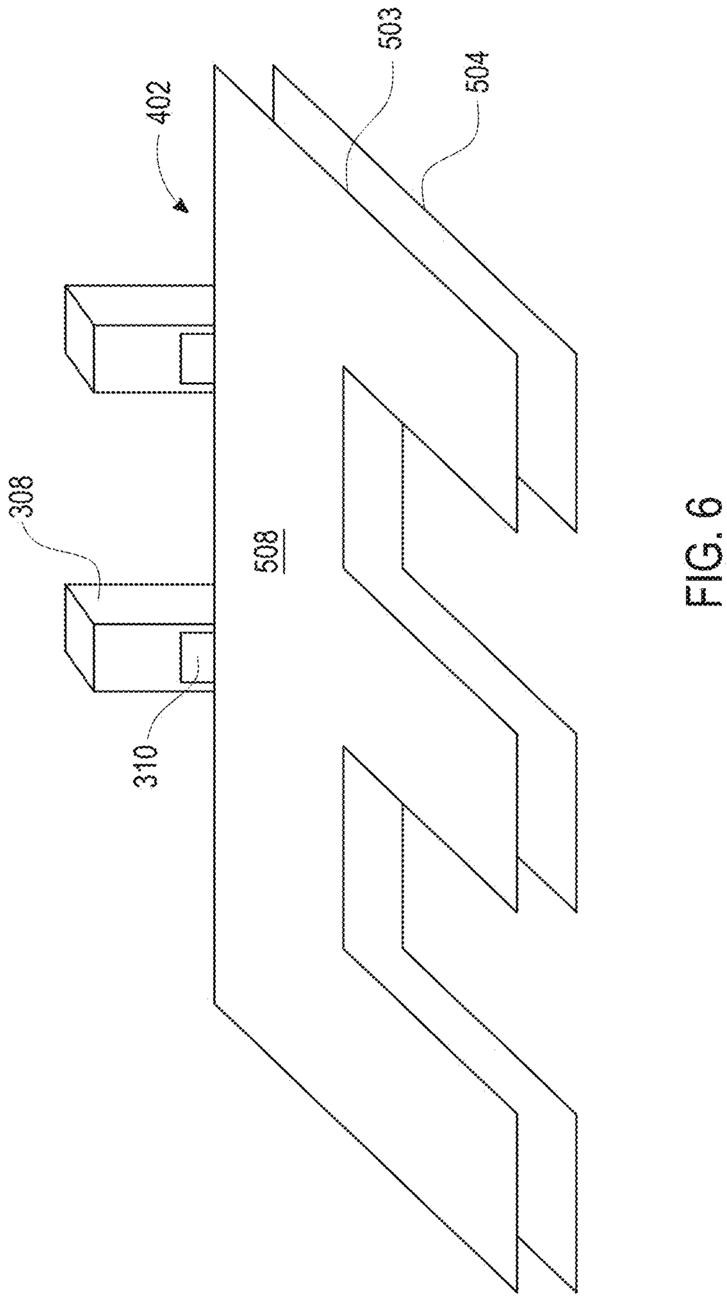
FIG. 6 depicts a perspective view of a portion of the order fulfillment system of FIG. 1 that shows elevators, output stations, a first function sortation system, and a second function sortation system, according to at least one embodiment of the presently disclosed subject matter.
Figure 7:
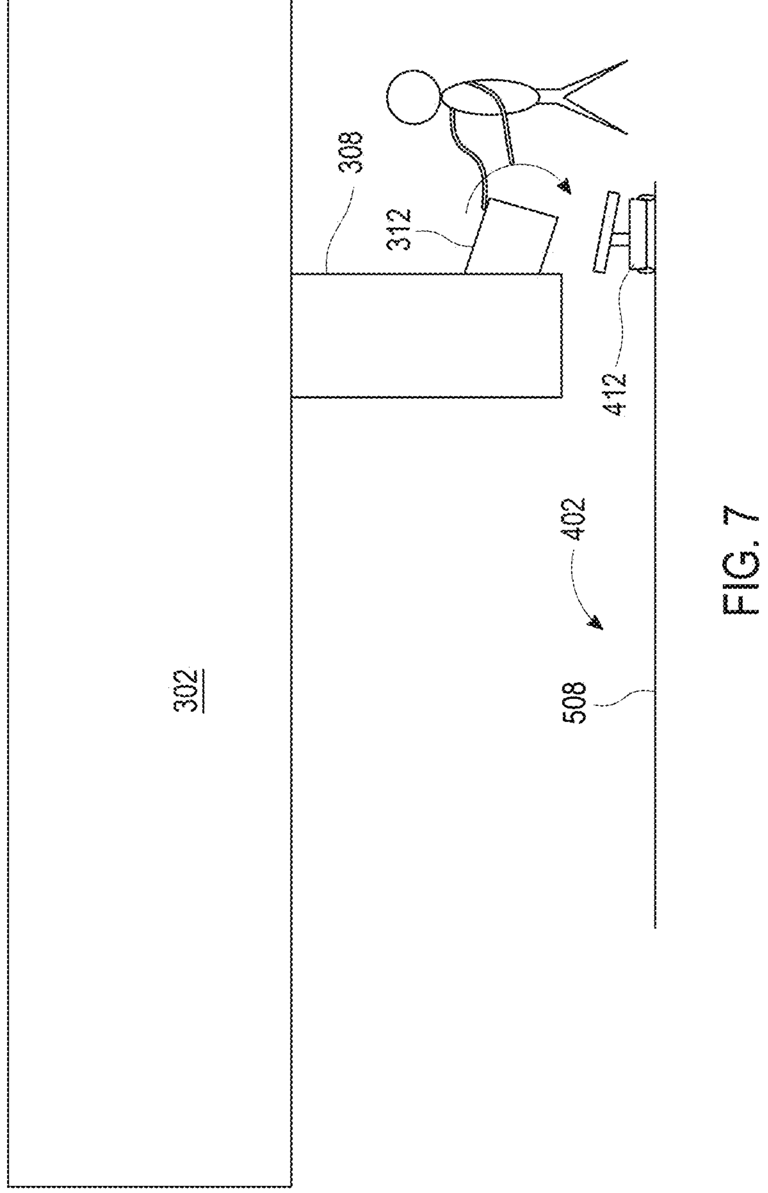
FIG. 7 depicts a schematic view of a portion of the order fulfillment system of FIG. 1 that shows an elevator, a storage bin, an output station, and a platform, according to at least one embodiment of the presently disclosed subject matter.
Figure 8:
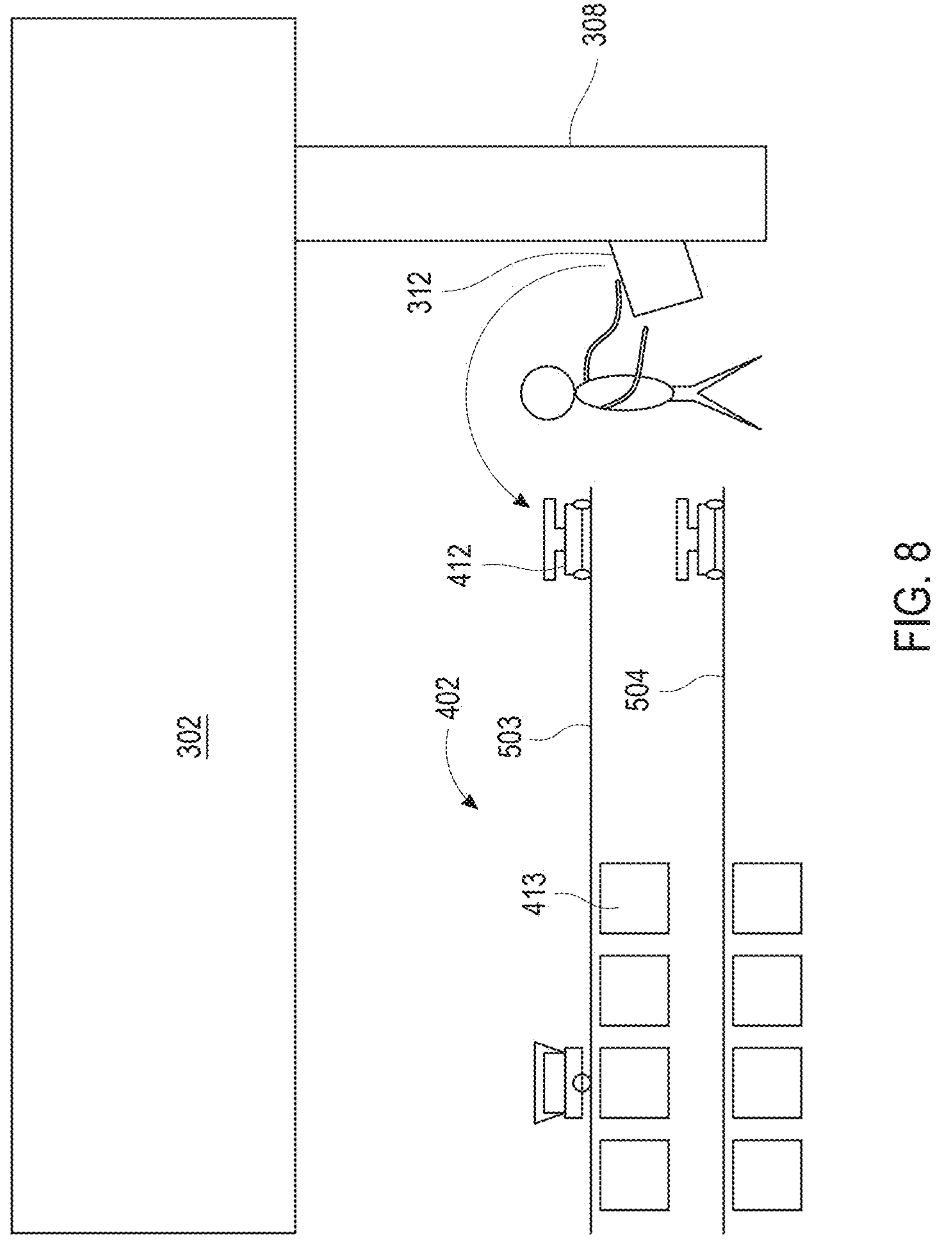
FIG. 8 depicts a perspective view of a portion of the order fulfillment system of FIG. 1 that shows an elevator, an output station, a first function sortation system, a second function sortation system, and destination receptacles, according to at least one embodiment of the presently disclosed subject matter.
Figure 10:
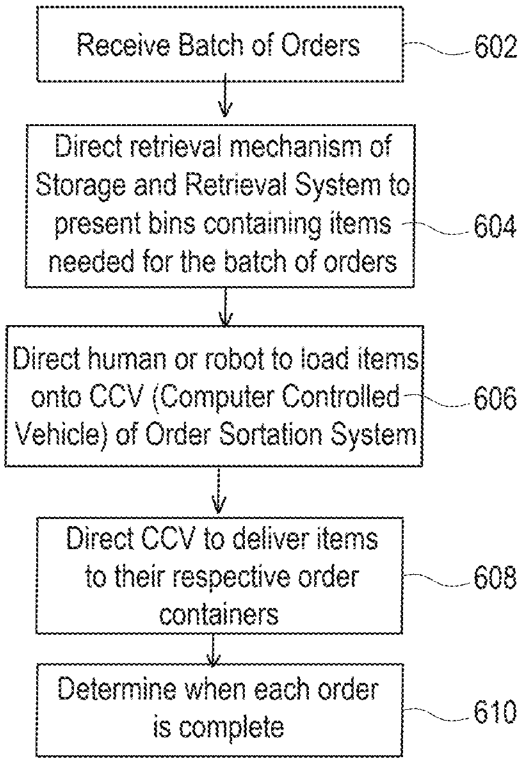
FIG. 10 is a flow chart depicting a method of operation of the fulfillment system of FIG. 1, according to at least one illustrated implementation, according to at least one embodiment of the presently disclosed subject matter.

FIG. 10 depicts an exemplary flowchart of an exemplary implementation of an improved order fulfillment system 500 for use with order fulfillment, according to one or more implementations of the presently disclosed subject matter. FIG. 10 accordingly depicts a flowchart of an exemplary process corresponding to order fulfillment system 500. The exemplary process shown in FIG. 5 may be implemented, for example, by control server 502. Referring to FIG. 10, at step 602, a batch of orders is received, for e.g., by or at control server 502. At step 604, a retrieval mechanism of article storage and retrieval system 302 is directed, for e.g., by control server 502 (or by the ASRS controller configured to control article storage and retrieval system 302) to transfer one or more storage bins 312 carrying articles 107 associated with the batch of orders to output station 310. At step 606, a human or a robot is directed, for example, by control server 502 (or by the sortation controller configured to control article storage and retrieval system 302) to transfer articles 107 at output station 310 onto computer controlled vehicles such as vehicles 412 forming part of article storage and retrieval system 302. At step 608, an automated vehicle 412 is directed, for e.g., by control server 502, to travel proximal to a first receptacle 413 to deliver one or more articles 107 carried on vehicle 412 to the first receptacle 413. At step 610, a determination is made, for e.g., by control server 502, that at least one order among the batch of orders associated with first receptacle 413 is complete; alternately, at step 610, a determination is made, for e.g., by control server 502, that the first receptacle 413 is full and therefore needs to be replaced before further articles 107 can be sorted to the destination represented by the filled up first receptacle 413.

In one implementation, either control server 502 or the sortation controller carries out sortation operations using autonomous mobile robots (AMRs) including computer controlled vehicles such as vehicles 412. In this implementation, a given AMR has been routed to a receptacle and the system recognizes that the receptacle is full. AMRs which are enroute to a destination receptacle which gets filled up after an AMR has been dispatched by the system to deliver an article to closes, the AMR is re-routed to the new destination.

In at least one embodiment, input station 512 (see FIG. 9) functions to hold articles that need to be sorted prior to such sorting. In one variation, input station 512 includes one or more input article holders that contain unsorted (i.e., to be sorted) articles. The article holders can be placed adjacent to an article information acquisition device 506 (see FIG. 9) and are preferably within the reachable range of article information acquisition device. In this way, a worker, conveyor system, or a robotic system may move an article holder into position and optionally remove empty (or otherwise finished) article holders present at input station 512. Articles and/or article holders may be moved through or added to input station 512 using a conveyor, a chute, an autonomous mobile robot, or using any suitable mechanism. Unsorted articles at input station 512 may in turn be sorted to a plurality of receptacles 413 wherein vehicles 412 transport the "to be sorted" articles to the receptacles 413. In at least one embodiment, input station 512 comprises an induction lift as described in U.S. Pat. No. 11,759,982 B1, and sold by Tompkins Robotics, Inc., of Orlando, Florida, wherein an article holder moves up and down and optionally sideways to transfer an article or parcel to be sorted to an appropriate level and deposit the article or parcel onto a computer-controlled vehicle such as vehicle 412.

Article information acquisition device 506 includes one or more sensors for article identification. This could include a sensor for scanning a barcode and/or an RFID tag reader. In one exemplary implementation, order fulfillment system 500 may include 4 barcode scanners: two side scanners, one top scanner, and a bottom scanner. The two side barcode scanners can capture barcodes on the sides of articles while rotating the article. The top scanner can capture barcodes from up top such as after article placement in a transfer tray or the article tray. The bottom scanner can capture barcodes from below as the article is removed from the article receptacle. A transparent shield can be placed above the bottom scanner so that if an article is dropped it will deflect off the shield. Any suitable sensing system may be used for collecting information of an article that can be used to determine a destination output receptacle.

Article information acquisition device 506 may further function to collect data of the objects and the environment. In one embodiment, article information acquisition device 506 includes an imaging system, which functions to collect image data. The imaging system can include at least one imaging device with a field of view of a region of interest that covers a region where article 107 is transferred to a vehicle 412 and input station 512. The imaging system may additionally include multiple imaging devices used to collect image data from multiple perspectives of a distinct region, overlapping regions, and/or distinct non-overlapping regions. The set of imaging devices (e.g., one imaging device or a plurality of imaging devices) may include a visual imaging device (e.g., a camera). The set of imaging devices may additionally or alternatively include other types of imaging devices such as a depth camera. Other suitable types of imaging devices may additionally or alternatively be used. Article information acquisition device 506 may collect data that is communicated to the control server 502 to facilitate article placement onto a transport device. For example, image data of a collection of articles 107 in input station 512 can be processed by an analysis model that outputs one or more sortation plans (e.g., points for article selection, or motion plans for approaching, and picking up an article).

Article information acquisition device 506 may additionally or alternatively include one or more sensors for article dimensioning. Article information acquisition device 506 could include one or more dimensional camera (e.g., a depth sensor) or similar other sensor system for dimensioning the article. Dimensioning can include determining spatial characteristics of the article (i.e., article dimensions). In one implementation the article dimensions can include defining a bounding volume of the article (e.g., a width, height, and depth of the article). The article dimensions may be used at least in part in planning placement orientation during induction and sortation into a receptacle 413. Other sensors such as load cells, proximity sensors, RFID tracking systems, and the like may also be used to monitor status of various aspects of order fulfillment system 500. Order fulfillment system 500 may additionally include other supplementary systems such as, for e.g., label printer and applicator, which function to enable labels to be produced and applied to an article prior to sortation.

In one implementation, article information acquisition device 506 interacting with the article can include determining an identifier of the article. This may be used when information concerning the identity of the article is unknown prior to picking of the article. Accordingly, the article may be scanned or imaged to determine a designated grouping. For example, for parcels, an address may be scanned and used for determining which route group to use for the parcel. Determining an identifier of the article may include scanning a barcode (or other suitable type of machine-readable code or information), reading an RFID tag, or reading another type of wireless identifier signal, visually classifying the article using computer vision analysis, and/or using some other identification or classification technique.

In one implementation, there is no information acquisition device 506; in such an embodiment, the identity of the article is determined by storage bin 312 from which the article is picked, for e.g., during the picking process. In one embodiment, article storage and retrieval system 302, e.g., in the form of an ASRS, may a storage bin 312 containing multiple articles of a single type such that all articles in the storage bin 312 have the same identifier. Article storage and retrieval system 302 communicates to control server 502 regarding the identify of articles present in a presented storage bin 312. The control server will then direct the picking of the article from the presented storage bin 312 onto the robot or onto the vehicle, such as vehicle 412, and the control server further communicates the identity of the article to the order sortation system 402. In such an implementation, an information acquisition device is not required because the article identity is passed from the article storage and retrieval system 302 (e.g., from the ASRS) to the order sortation system 402 electronically.

In one embodiment, after the identifier of the article (or the identity of the article) is determined, the system or the controller may determine a targeted article receptacle for the article based on the identifier of the article. In other words, an article can be picked, its identity determined either by scanning carried out by an information acquisition device, or by an electronic message received at the system or the controller, for e.g., from the article storage and retrieval system 302, and then based on the identity of the article, the system or the controller queries a database to determine which of the targeted article receptacle to associate with the article. The system or the controller can then facilitate sorting the article into the targeted article receptacle such as receptacle 413.

Herein, reference made to "articles" characterizes the objects subjected to sortation by an order sortation system 402. An article can be any suitable type of object such as a package, a parcel, a product, raw material good (e.g., a manufactured part), and/or any suitable type of object that needs sortation organization. In the case of shipping or other operational contexts, an article may have various properties. In a parcel processing center, articles could be, for example: boxed goods, bagged goods, and/or parcels. An article could have destination information indicating where it should be shipped. An article could have an article type information that could correspond to a stock keeping unit (SKU) identifier or an alternative product identifier.

Herein, reference is also made to receptacles such as receptacle 413, which is used to characterize the receptacle used to hold articles once sorted. The form factor and variety of the receptacles can vary greatly, and the system may be adapted to diverse types of receptacles such as boxes, receptacles, chutes, bins, trays, bags, gaylords, and the like. Article receptacles may use any suitable form factor and, in some cases, may use the same type of receptacle. In some variations, the form factor may be customized for particular variations and implementations of order fulfillment system 500 as described herein.

In various embodiments, control server 502 is a control server or a controller that is configured for communicating with one or more components of order fulfillment system 500 as described herein, and as shown, for example, in FIG. 1. In one implementation, control server 502 includes memory, a processor, and/or one or more communication interfaces communicatively coupled to each other. A network may form part of order fulfillment system 500, wherein the network may take on any appropriate form, including a wireless network such as Wi-Fi, cellular, or other frequency bands for private use, or a hard-wired network such as LAN, WAN, internet, etc., and combinations thereof. In one implementation, control server 502 may communicate over the network with the cloud. In some implementations, one or more components of control server 502 may reside in the cloud. Similarly, several of the components such as, for example, article information acquisition device 506, wireless access point 514, computer-controlled vehicles such as vehicles 412, and control server 502 may communicate over the network with the cloud. In some implementations, one or more components of order fulfillment system 500 may reside in the cloud. For example, in one implementation, control server 502 may reside in the cloud. In at least one implementation, control server 502 may be in communication with one or more third-party servers, such as warehouse management system servers and automated transport device operations control servers.

As used herein, the term "cloud" refers to several servers connected to the internet that can be leased as part of a software or application service. Cloud-based services can include web hosting, data hosting and sharing, and software or application use. The term "cloud" also refers to cloud computing, where several servers are linked together to share the load. This means that instead of using one single powerful machine, complex processes can be distributed across multiple smaller computers. In various implementations, control server 502 can be or can otherwise include a server as the term "server" is understood in its broadest sense. The term "server" as used herein includes any computer that provides data to other computers. It may serve data to systems on a local area network (LAN) or a wide area network (WAN) over the Internet. In various implementations, control server 502 can be or can include a cloud server. The term "cloud server" as used herein includes any pooled, centralized server resource that is hosted and delivered over a network—typically the Internet—and accessed on demand by multiple users. A cloud server can be remotely located (e.g., reside in a remote cloud server configuration). A cloud server can be a virtual server (rather than a physical server) running in a cloud computing environment. A cloud server can be built, hosted, and delivered via a cloud computing platform via the internet, and can be accessed remotely. A cloud server can include all the software it requires to run and can function as an independent unit. A cloud server can perform all the same functions as a traditional physical server including delivering processing power, storage, and applications. One of the advantages of cloud storage is that there are many distributed resources acting as one-often called federated storage clouds. This makes the cloud very tolerant of faults, due to the distribution of data. Use of the cloud can reduce the creation of different versions of files, due to shared access to documents, files, and data.

Each of the components shown or mentioned in FIGS. 1-9 may be in communication with one or more other components through a wired and/or a wireless network. For example, the cloud, the control server 502 may further communicate with receptacles 413, sortation engine 422, article information acquisition devices 506, vehicles 412, article storage and retrieval system 302, order sortation system 402, and wireless access point 514 over a network.

In at least one embodiment, the article storage and retrieval system 302 is a standalone system from a first manufacturer and the order sortation system 402 is a standalone system from a second manufacturer, the second manufacturer different and independent from the first manufacturer.

The systems and methods described herein may advantageously conserve valuable real estate square footage or space and thereby minimize cost for investment by locating or positioning a storage and retrieval system directly above (or below) an order sortation system such that the combined system can occupy almost just half the space or less as compared to a conventional storage and retrieval system positioned adjacent to an order sortation system, which may need conveyors or other connections between the systems in order to transfer goods from one system to the other, thereby requiring additional space beyond the space occupied by just the footprints of both systems. To elaborate, in prior art applications, a storage and retrieval system is typically located separate from and adjacent to an order sortation system. As persons of skill in the art understand, the inventors named in the instant application have overcome several limitations existing in the art that have prevented such an innovation to be undertaken; such limitations include but are not limited to the following: (a) different manufacturers typically provided each sub-system whereby physically overlaying one over the other was not a viable option, wherein integrating the two disparate control systems was generally cumbersome and may even require a third go-between or "bandage" control system; (b) the timeline of when an automated storage and retrieval (ASRS) provider gets involved in a warehouse automation project planning process as compared to when an order sortation system provider is brought in; with the ASRS portion requiring more time and capital outlay, the ASRS provider was often brought in much earlier whereby integrating the two systems was difficult at best or impractical at worst; (c) the cost of the ASRS system being in orders of magnitude greater than the order sortation system causing an inertia that prevents the re-design of an expensive solution to add a sortation system when the ASRS system might be at least meeting expectations; (d) typically order fulfillment projects and warehouse automation projects are spearheaded by a ASRS provider that has no incentive to think big picture to include a sortation system manufactured by a third party; (e) issues surrounding safety arising from structural modifications that needed to the ASRS system in order to accommodate an order sortation system in a manner that minimizes total square footage of the two systems; (f) inflexibility around apportionment of risk or liability between two different manufacturers of two different but complementary systems; (g) the need to access various parts of the article storage and retrieval system for reasons such as: preventive maintenance of various sub-components of the article retrieval mechanism including cables, wheels, channels, fixing a malfunction, retrieving a fallen article or fallen storage bin; (h) including two disparate computer control systems that may be designed under completely different programming languages or protocols or where one control system is based on open source software whereas the other is based on proprietary software or inhouse enhanced off the shelf software; (i) issues around figuring out as to which party owns the rights associated with any commonly developed IP (software and hardware) needed for the systems to communicate with each other. The invention disclosed herein advantageously overcomes the above noted limitations and challenges faced in the art. The invention disclosed herein provides for the combined planning, development and management of hardware, software and infrastructure where this was previously impractical.

The systems and methods described herein may further advantageously eliminate the need to batch/aggregate like product, either by like product type, or customer type, or store type (aka 'buffer sequencing'), and to just flow each product/item of the customer or store orders as they flow to the warehouse for picking and unit sortation. By directly routing items from an article storage and retrieval system to an order sorting or sortation system for collation/packing/shipping, the need to sequence orders upfront may be greatly reduced or even eliminated. This reduction in sequencing may result in significantly reducing or even eliminating the wait times associated with article aggregation. Consolidating an article storage and retrieval system with an item sorting or sortation system advantageously allows articles to be immediately diverted to an appropriate final collation or destination station for collation as orders and packing, each destined for a retail location (e.g., store) or for delivery to an end customer (e.g., customer home address, work address, post office box, locker). As a result, there are no intermediate operations related to determining which sequence articles should be retrieved and sorted in the process of retrieving the correct items and sorting those items for packing and/or shipping. The systems and methods described herein may further advantageously provide for order cycling wherein a wave of picks are done and still have some outstanding articles to arrive, but the system decides to not hold up the location, so the location is moved up until it is ready or needed. The invention disclosed herein accordingly advantageously overcomes various limitations and challenges faced in the art.

A person of ordinary skill in the art would understand that the implementations described in this application are examples, and that the scope of this application is not limited by these examples or implementations. For instance, while the preferred implementation relates to sorting robots, the apparatus and method described herein would apply equally well to any automated transport device set up meant for transporting or transferring articles of disparate sizes. For instance, the disclosed apparatus and method may find applications in conjunction with pick-assist robot applications. Similarly, the disclosure here is also relevant to lifting robots and several other types of robots used in warehouse and material handling facility applications. In another exemplary application, order fulfillment system 500 can be used for returned goods processing and/or good restocking. For example, mixed article receptacles of returned goods could be appropriately sorted for reshelving, restocking, or other subsequent processing. In another example, newly received article orders could be sorted into appropriate receptacles for replenishing article stock within a store. The size and automated affordances of order fulfillment system 500 is such that it could be used in a variety of environments such as in a back-warehouse of a retail store or in an order fulfillment center (e.g., such as for ecommerce returns). In another exemplary application, order fulfillment system 500 may be used for order fulfillment where a collection of articles is sorted into individual article receptacles, where each article receptacle may be associated with a particular order. In some embodiments, the orders may be, for e.g., for consumers such as ecommerce orders; in at least one example, the orders represent commercial orders for delivery to a business. In an analogous manner, order fulfillment system 500 may also be used for dynamic or custom kitting for industrial or consumer goods.

A person of ordinary skill in the art would understand that the embodiments described in this application are examples, and that the scope of this application is not limited by these examples or embodiments. For instance, while the preferred embodiment relates to order sorting in a warehouse or industrial facility, the apparatus and method described herein would apply equally well to any material handling environment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment comprising software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM [erasable programmable read-only memory] or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

These and other changes can be made to the disclosure in light of the Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. An order fulfillment system comprising:

an order sortation system comprising one or more computer controlled vehicles for transporting and depositing articles to be sorted into a plurality of receptacles in response to commands;

an article storage and retrieval system separate from the order sortation system, the article storage and retrieval system positioned above the order sortation system, the article storage and retrieval system comprising a three-dimensional array of storage spaces from which the articles to be sorted are automatically retrievable by one or more retrieval mechanisms in response to commands; and a controller configured to:

direct a retrieval mechanism of the article storage and retrieval system to move a storage bin containing a first article to an output station;

direct a computer controlled vehicle to transport and deposit the first article collected from the storage bin at the output station into a first destination receptacle.

2. The system of claim 1, wherein a whole footprint of the order sortation system is accommodated within a footprint of the article storage and retrieval system.

3. The system of claim 1, wherein at least 51% of a square footage of a footprint of the order sortation system is accommodated within a footprint of the article storage and retrieval system.

4. The system of claim 1, wherein at least a portion of a footprint of the order sortation system extends beyond a footprint of the article storage and retrieval system.

5. The system of claim 1, wherein a footprint of the order sortation system is less than a footprint of the article storage and retrieval system.

6. The system of claim 1, wherein the article storage and retrieval system is arranged above the order sortation system in a vertical stacked configuration such that at least 51% of a vertical projection of a footprint of the order sortation system is accommodated within a vertical projection of a footprint of the article storage and retrieval system.

7. The system of claim 1, wherein the computer controlled vehicle comprises wheels that contact a platform while the computer controlled vehicle travels on the platform.

8. The system of claim 1, wherein the computer controlled vehicle traverses one of: a track, a platform, and a floor, to transport and deposit the first article into the first destination receptacle.

9. The system of claim 1, wherein the controller comprises a first controller associated with the article storage and retrieval system and a second controller associated with the order sortation system, wherein an output of the first controller is provided as an input to the second controller.

10. The system of claim 1, wherein a storage bin is transferred to the output station by one of: a cable trolley, a shuttle robot traveling on a railing, and an elevator.

11. The system of claim 1, wherein one of: a person and a transfer robot retrieves the first article carried on the storage bin at the output station for transfer onto the computer controlled vehicle.

12. The system of claim 1, wherein the order sortation system comprises a first function sortation system arranged above second function sortation system in a vertically stacked configuration.

13. The system of claim 12, wherein a total footprint of both the first and second function sortation systems is equal to a footprint needed for one of the first and second function sortation systems.

14. The system of claim 13, further comprising: at least one belt conveyor line positioned and operable to transfer an article from the output station of the article storage and retrieval system to an input station of the order sortation system.

15. The system of claim 13, wherein a number of output stations of the article storage and retrieval system in operation is varied over time, and the controller synchronizes a current retrieval rate of the storage and retrieval system with a current sortation rate of the order sortation system based at least in part on a total number of output stations of the article storage and retrieval system in operation at a given instant of time.

16. The system of claim 1, wherein the order sortation system has one or more input stations, wherein transfer of an article from an output station of the article storage and retrieval system to an input station of the order sortation system is performed by one of: a transfer robot, and a human.

17. The system of claim 1, wherein the computer controlled vehicle traverses one of a track, a platform, and a floor, to transport the first article to a position about the first destination receptacle for depositing the first article into the first destination receptacle.

18. A method of order fulfillment comprising:

receiving, at a controller of an order fulfillment system, an order;

direct a retrieval mechanism of an article storage and retrieval system to move a storage bin containing a first article required for the order to an output station, the article storage and retrieval system comprising a three-dimensional array of storage spaces from which the articles to be sorted are automatically retrievable by one or more retrieval mechanisms in response to commands;

direct one of: a human and a robotic arm to load the first article from the storage bin onto a computer controlled vehicle of an order sortation system, the article storage and retrieval system separate from an order sortation system, the order sortation system positioned below the article storage and retrieval system, the order sortation system comprising one or more computer controlled vehicles for transporting and depositing articles to be sorted into a plurality of receptacles in response to commands;

determine a first destination receptacle among a plurality of destination receptacles to deliver, with the computer controlled vehicle, the first article based on a destination determined for the first article;

direct the computer controlled vehicle to transport and deposit the first article into the first receptacle, wherein the first destination receptacle corresponds with the order; and determine when the order is complete.

19. The method of claim 18, wherein the computer controlled vehicle traverses one of a track, a platform, and a floor, to transport the first article to a position about the first destination receptacle for depositing the first article into the first destination receptacle.

20. The method of claim 18, wherein the article storage and retrieval system is arranged above the order sortation system in a vertical stacked configuration such that at least 51% of a vertical projection of a footprint of the order sortation system is accommodated within a vertical projection of a footprint of the article storage and retrieval system.

* * * * *